US012219337B2

(12) United States Patent

Zhao et al.

(10) Patent No.: US 12,219,337 B2
(45) Date of Patent: Feb. 4, 2025

(54) CONDUCTIVE FILM FOR SOUND PRODUCING APPARATUS AND SOUND PRODUCING APPARATUS

(71) Applicant: Goertek Inc., Weifang (CN)

(72) Inventors: Guodong Zhao, Weifang (CN); Chaofeng He, Weifang (CN)

(73) Assignee: Goertek Inc., Shandong (CN)

( * ) Notice: Subject to any disclaimer, the term of this patent is extended or adjusted under 35 U.S.C. 154(b) by 265 days.

(21) Appl. No.: 17/636,767

(22) PCT Filed: Dec. 26, 2019

(86) PCT No.: PCT/CN2019/128551

§ 371 (c)(1),
(2) Date: Feb. 18, 2022

(87) PCT Pub. No.: WO2021/031496

PCT Pub. Date: Feb. 25, 2021

(65) Prior Publication Data

US 2022/0279279 A1 Sep. 1, 2022

(30) Foreign Application Priority Data

Aug. 19, 2019 (CN) ........................ 201910764584.2

(51) Int. Cl.
*H04R 7/12* (2006.01)
*H04R 9/06* (2006.01)

(52) U.S. Cl.
CPC .............. *H04R 7/125* (2013.01); *H04R 9/06* (2013.01)

(58) Field of Classification Search
CPC ........... H04R 7/125; H04R 9/06; H04R 1/06; H04R 7/12; H04R 9/02; H04R 2207/021; H04R 2400/11
See application file for complete search history.

(56) References Cited

U.S. PATENT DOCUMENTS 7,564,177 B2 * 7/2009 Yoshimatsu ......... H03H 9/0595 310/365
7,923,905 B2 * 4/2011 Umemiya .............. H10N 30/02 310/344
8,309,268 B2 * 11/2012 Buche ................. H01M 8/0234 429/510

(Continued)

FOREIGN PATENT DOCUMENTS

CN 103024638 A 4/2013
CN 104683923 A * 6/2015 ............... H04R 7/06

(Continued)

OTHER PUBLICATIONS

International Search Report dated May 19, 2020 corresponding to International Patent Application No. PCT/CN2019/128551.

*Primary Examiner* — Angelica M McKinney
(74) *Attorney, Agent, or Firm* — Goertek Inc.

(57) ABSTRACT

Disclosed are a conductive film for a sound producing apparatus, and a sound producing apparatus. The conductive film includes a conductive layer and substrate layers bonded to two surfaces of the conductive layer, the substrate layers comprising two first substrate layers directly bonded to the conductive layer, the first substrate layers being made of a thermoplastic elastomer, and the first substrate layers are connected with the conductive layer by means of hot pressing.

14 Claims, 5 Drawing Sheets

(56) References Cited

U.S. PATENT DOCUMENTS

| | | | | |
|---|---|---|---|---|
| 9,503,822 | B2 * | 11/2016 | Zhao | H04R 19/005 |
| 9,955,266 | B2 * | 4/2018 | Liu | H04R 7/125 |
| 2003/0078157 | A1 * | 4/2003 | Matsuoka | H01M 8/0286 429/535 |
| 2018/0370063 | A1 * | 12/2018 | Lehmann | B32B 27/12 |
| 2019/0189561 | A1 * | 6/2019 | Rusli | H01L 23/5226 |
| 2019/0355654 | A1 * | 11/2019 | Xu | H01L 23/49827 |

FOREIGN PATENT DOCUMENTS

| | | | | | |
|---|---|---|---|---|---|
| CN | 105792078 | A | | 7/2016 | |
| CN | 207053756 | U | | 2/2018 | |
| CN | 108337609 | A | * | 7/2018 | H04R 7/14 |
| CN | 109874098 | A | * | 6/2019 | H04R 31/00 |
| CN | 110545505 | A | | 12/2019 | |
| JP | 2005201847 | A | * | 7/2005 | G01N 27/12 |
| JP | 2009046561 | A | * | 3/2009 | H10N 1/00 |
| WO | WO-2013115270 | A1 | * | 8/2013 | B41J 2/14209 |
| WO | WO-2018180920 | A1 | * | 10/2018 | C22C 9/00 |

* cited by examiner

CONDUCTIVE FILM FOR SOUND PRODUCING APPARATUS AND SOUND PRODUCING APPARATUS

CROSS-REFERENCE TO RELATED APPLICATIONS

This application is a National Stage of International Application No. PCT/CN2019/128551, filed on Dec. 26, 2019, which claims priority to Chinese Patent Application No. CN201910764584.2, filed Aug. 19, 2019, both of which are hereby incorporated by reference in their entireties.

TECHNICAL FIELD

The present disclosure relates to the field of electroacoustic transformation technology, and more particularly, the present disclosure relates to a conductive film for a sound producing apparatus and a sound producing apparatus.

BACKGROUND

A sound producing apparatus generally includes a diaphragm and a voice coil combined to one side of the diaphragm, and may further include an electrical connector electrically connecting an internal circuit and an external circuit of the sound producing apparatus. The voice coil includes two voice coil leads, the two voice coil leads are electrically connected with two pads of the electrical connector through spot welding, respectively, and the electrical connector is electrically connected with an external circuit at the same time, so as to control the electrical signal in the voice coil through the electrical signal of the terminal product.

Generally, to realize electrical connection with the electrical connector, it is necessary to have a lead of the voice coil drawn out for a certain length. However, when the voice coil vibrates, the lead of the voice coil in a sound producing apparatus with such a structure is prone to breaking, causing product defects.

In the prior art, some sound producing apparatuses further include a damper which is usually combined to one side of the diaphragm and can be used as an electrical connection between the voice coil and the outside. In particular, it is possible to establish an electrical connection by connecting a connecting wire of the voice coil to the damper, and the damper to an external circuit. In fact, although the application of damper effectively eliminates a hidden risk of broken voice coil leads, the existence of damper occupies some internal space of the sound producing apparatus, thus degrading acoustic performance of the product to a certain extent and thereby deteriorating the audio experience of users.

In recent years, many researchers began to develop diaphragms with conductive function, which broadens use of conductive diaphragms in the sound producing apparatuses. For conductive films, currently used mainstream methods include electrophoresis of conductors, electroplating of conductors, injection molding of conductors, addition of conductive coatings, addition of conductive ink layers, and laser etching in the diaphragm. However, the above-mentioned methods are more or less disadvantageous in difficult technical implementation, unfit for mass production, high cost, low reliability and insufficient acoustic performance.

SUMMARY

An object of the present disclosure is to provide a new technical solution of a conductive film for a sound producing apparatus and a sound producing apparatus.

According to the first aspect of the present disclosure, provided is a conductive film for a sound producing apparatus, including a conductive layer and substrate layers bonded to two surfaces of the conductive layer, the substrate layers including two first substrate layers directly bonded to the conductive layer, the first substrate layers being made of a thermoplastic elastomer; and the first substrate layers are connected with the conductive layer by means of hot pressing.

Optionally, a first one of the first substrate layers is connected with one surface of the conductive layer by means of hot pressing, after a conductive circuit is formed by etching on the conductive layer, a second one of the first substrate layers is connected with the other surface of the conductive layer and the first one of the first substrate layers by means of hot pressing.

Optionally, the conductive layer is a metal foil.

Optionally, the conductive layer is a copper foil.

Optionally, the first substrate layers are made of TPU or TPEE.

Optionally, the conductive layer has a thickness of 12 to 36 μm, and the first substrate layers have a thickness of 3 to 50 μm.

Optionally, the substrate layers further include second substrate layers bonded to surfaces of the first substrate layers away from the conductive layer, the first substrate layers being connected with the second substrate layers before being connected with the conductive layer.

Optionally, the second substrate layer is made of plastic, thermoplastic elastomer or rubber.

Optionally, the second substrate layer is made of any one of PEEK, PAR, PEI, PI, PPS, PEN, PET, TPEE and TPU.

Optionally, the conductive layer is provided with an inner pad configured to be connected with a voice coil and an outer pad configured to be connected with an external circuit; and both the inner pad and the outer pad are exposed from the substrate layers.

Optionally, the conductive film for a sound producing apparatus includes an inner part located on an inner side, a deformation part disposed outside the inner part, and an outer part disposed outside the deformation part; and the conductive layer includes a first conductive layer distributed on the inner part, a second conductive layer distributed on the outer part and third conductive layers distributed on the deformation part, the third conductive layers connecting the first conductive layer and the second conductive layer, and the first conductive layer, the second conductive layer and the third conductive layers are connected to form at least one conductive trace.

Optionally, the first conductive layer and the second conductive layer each include two parts independent of each other, and the two parts of the first conductive layer, the two parts of the second conductive layer and the third conductive layers form two independent conductive traces.

According to the second aspect of the present disclosure, provided is a sound producing apparatus including a vibration system and a magnetic circuit system fitted with the vibration system;

the vibration system includes a sound producing diaphragm and a voice coil combined to one side of the sound producing diaphragm, the sound producing diaphragm adopting the conductive film described above.

According to the third aspect of the present disclosure, provided is a sound producing apparatus including a vibration system and a magnetic circuit system cooperating with the vibration system;

the vibration system includes a sound producing diaphragm, a voice coil combined to one side of the sound producing diaphragm, and a supporting diaphragm for elastically supporting the voice coil, the supporting diaphragm adopting the conductive film described above.

Optionally, the voice coil includes two long sides and two short sides, and two supporting diaphragms are disposed on the two short sides of the voice coil; and at least one of the supporting diaphragms adopts the conductive film.

The conductive film provided by the embodiments of the present disclosure is a multilayer composite structure including a conductive layer and has good conductive performance. The use of the conductive film can effectively avoid the phenomenon of broken voice coil leads. The conductive film can be used not only as a sound producing diaphragm, but also as a supporting diaphragm. The conductive film vibrates smoothly when working, which can improve the loudness of sound and reduce the nonlinear distortion.

Other features and advantages of the present disclosure will become apparent from the following detailed description of exemplary embodiments of the present disclosure with reference to the appended drawings.

BRIEF DESCRIPTION OF DRAWINGS

The accompanying drawings which are incorporated in and constitute a part of the description illustrate embodiments of the present disclosure and together with the description thereof serve to explain the principles of the embodiments of the present disclosure.

DETAILED DESCRIPTION OF EMBODIMENTS

Figure 1:
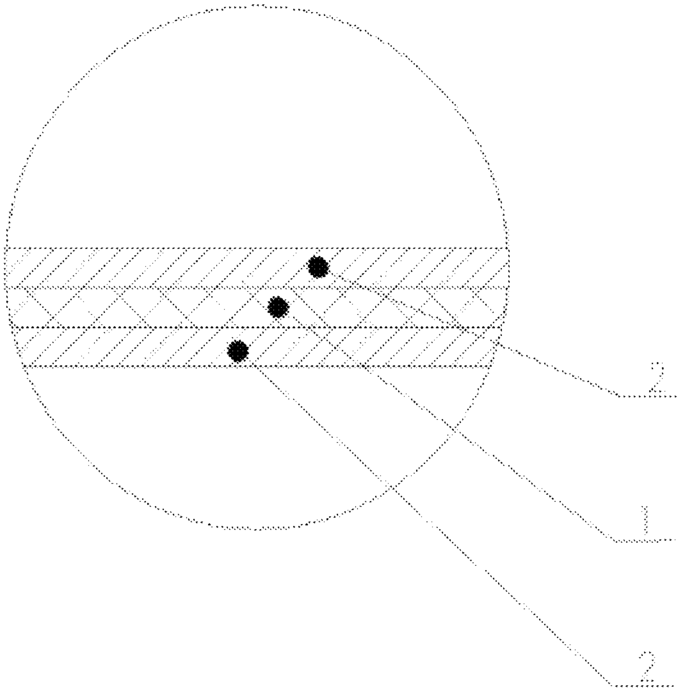
FIG. 1 is a partial schematic view of a conductive film provided by an embodiment of the present disclosure.

Various exemplary embodiments of the present disclosure will be described in detail with reference to the accompanying drawings. It should be noted that unless otherwise specified, the relative arrangement, numerical expressions and values of components and steps set forth in these embodiments do not limit the scope of the present disclosure.

The following description of at least one exemplary embodiment is in fact merely illustrative and is in no way intended to limit the present disclosure and its application or use.

Techniques, methods and devices known to those ordinarily skilled in the relevant art may not be discussed in detail, but where appropriate, the techniques, methods and devices should be regarded as part of the authorized description.

In all the examples shown and discussed herein, any specific value should be interpreted as exemplary only and not as a limitation. Thus, other examples of the exemplary embodiment can have different values.

It should be noted that similar reference numerals and letters denote similar items in the following figures, and therefore, once a certain item is defined in one figure, it is not necessary to further discuss it in the following figures.

As shown in FIG. 1, a conductive film for a sound producing apparatus provided by an embodiment of the present disclosure includes a conductive layer 1 and substrate layers bonded to two surfaces of the conductive layer 1. The substrate layers include two first substrate layers 2 directly bonded to the conductive layer 1. The first substrate layers 2 are made of thermoplastic elastomer. The first substrate layers 2 are connected with the conductive layer 1 by means of hot pressing.

The conductive film provided by the embodiment of the present disclosure is a multilayer composite structure, which is composed of a conductive layer 1 and non-conductive substrate layers. The substrate layers include at least two layers, and the conductive layer 1 is disposed between any two of the substrate layers. That is to say, the conductive layer 1 is wrapped by the at least two substrate layers, so as to prevent the conductive layer 1 from being in contact with other components and short circuit occurring. The substrate layers can also play a good protective role on the conductive layer 1.

The substrate layers of the present disclosure include first substrate layers 2, and a material adopted by the first substrate layers 2 is thermoplastic elastomer TPE. Thermoplastic elastomer TPE is non-conductive, and has high impact strength and good low temperature flexibility. Especially, the thermoplastic elastomer TPE has relatively high adhesion at high temperature. Specifically, the thermoplastic elastomer TPE forms a viscous flow state above 110° C. and has great viscosity when being hot pressed, so that the first substrate layers 2 and the conductive layer 1 can be combined together.

In the present disclosure, the use of an adhesive can be omitted in the process of combining the first substrate layers 2 with the conductive layer 1, thus avoiding the problem that a special adhesive needs to be used when the first substrate layers 2 and the conductive layer 1 are combined, and a selection of the adhesive is more troublesome. In addition, compared with the adhesive bonding method, the bonding of the first substrate layers 2 and the conductive layer 1 can be made to have the same firmness by adopting the method in the present disclosure, and an overall thickness of the conductive film will not be affected by the existence of the adhesive layer.

In one example of the present disclosure, the first substrate layers 2 are made of thermoplastic polyurethane elastomer TPU or thermoplastic polyester elastomer TPEE. The thermoplastic polyurethane elastomer TPU and the thermoplastic polyester elastomer TPEE both belong to the thermoplastic elastomer TPE and have relatively high adhesion at high temperature. Therefore, when the first substrate layer 2 is made of the thermoplastic polyurethane elastomer TPU or the thermoplastic polyester elastomer TPEE, the first substrate layer 2 can be well connected with the conductive layer 1 without using an adhesive in a hot pressing manner. The present disclosure has the characteristics of simple combination mode, good firmness and difficult separation.

It should be noted that the conductive film and the two first substrate layers 2 provided by the embodiments of the present disclosure can be made of the same material or different materials, which can be flexibly adjusted by those skilled in the art according to the actual needs. For example, the first one of the first substrate layers 2 is made of the thermoplastic polyurethane elastomer TPU and the second one of the first substrate layers 2 is made of the thermoplastic polyester elastomer TPEE, and the two first substrate layers 2 are bonded to two surfaces of the conductive layer 1. For another example, the two first substrate layers 2 are both made of the thermoplastic polyurethane elastomer TPU, and the two first substrate layers 2 are bonded to two surfaces of the conductive layer 1. For yet another example, both of the first substrate layers 2 are made of the thermoplastic polyester elastomer TPEE, and the two first substrate layers 2 are bonded to two surfaces of the conductive layer 1.

The conductive layer 1 of the present disclosure is a metal foil. For example, the conductive layer 1 is a copper foil. The copper foil is a thin sheet structure, which has low surface oxygen characteristics and can easily adhere to the surface of various substrates made of different materials. Moreover, copper has better conductivity, which can make the formed conductive film have good conductivity. A predetermined circuit pattern may be formed on the conductive layer 1 by etching eroding or the like well-known to those skilled in the art.

In one example of the present disclosure, the conductive layer 1 is made of rolled copper foil, such as RA copper foil or HA copper foil. The rolled copper foil has excellent tensile strength and high elongation, and has good ductility when combined with the first substrate layers 2 by hot pressing.

Figure 3:
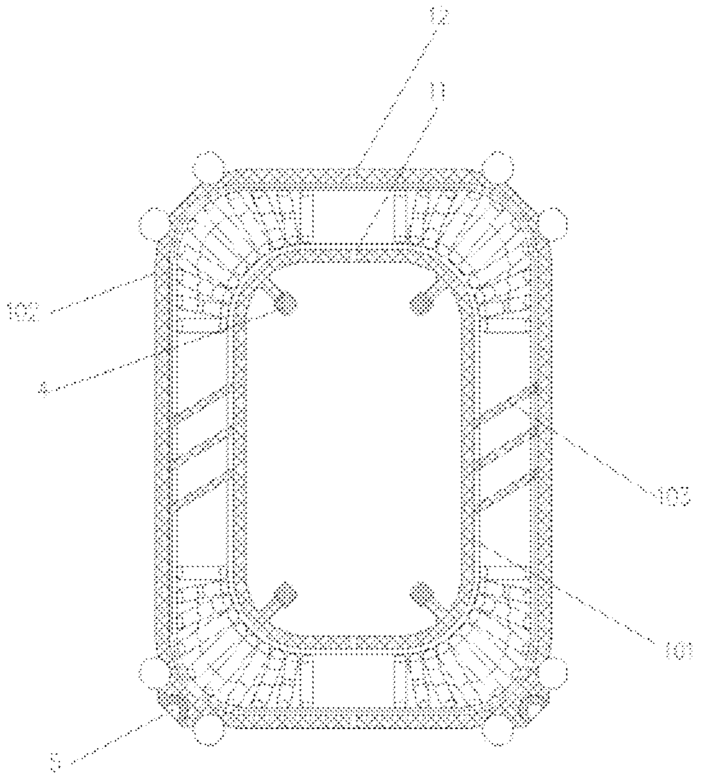
FIG. 3 is a perspective view of the conductive film provided by the embodiments of the present disclosure.

As shown in FIG. 3, the conductive layer 1 of the present disclosure is further provided with an inner pad 4 and an outer pad 5, respectively.

The inner pad 4 is configured to be connected with a voice coil. The outer pad 5 is configured to be connected with an external circuit. Moreover, both the inner pad 4 and the outer pad 5 are exposed from the substrate layers so as to facilitate the implementation of electrical connection.

In the present disclosure, the first substrate layers 2 and the conductive layer 1 are connected together by means of hot pressing. The first substrate layers 2 are made of thermoplastic elastomer TPE, and the two opposite surfaces of the first substrate layers 2 are respectively provided with protective films. During the hot pressing process, the protective film on the surface to be hot-pressed is removed to achieve firm bonding with the conductive layer 1.

Figure 6:
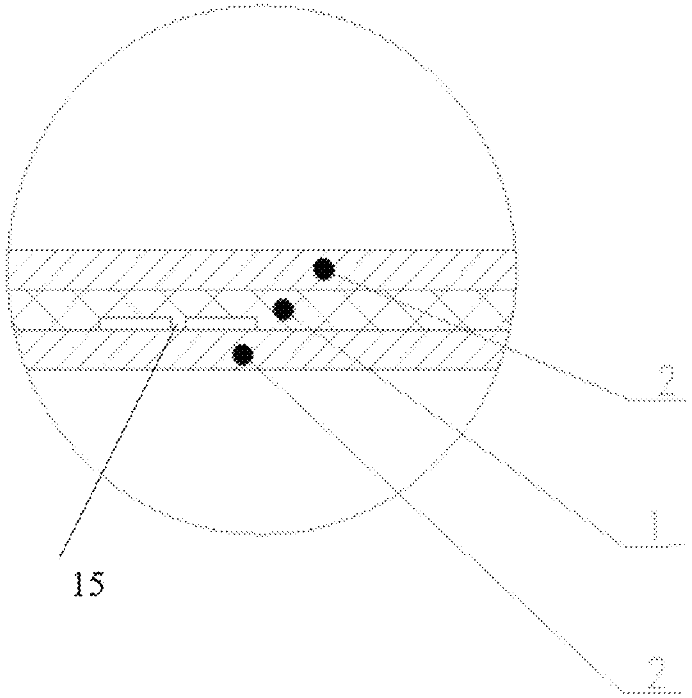
FIG. 6 is a structural schematic diagram of a sound producing apparatus provided by one embodiment of the present disclosure.

The hot pressing manner used between the first substrate layers 2 and the conductive layer 1 is as follows: first, connecting a first one of the first substrate layers 2 to one surface of the conductive layer 1 by hot pressing; etching the conductive layer 1, after a conductive trace 15 is formed on the conductive layer 1 by etching, connecting a second one of the first substrate layers 2 to the other surface of the conductive layer 1 and the first one of the first substrate layers by hot pressing; and electroplating and slitting molding an exposed portion of the conductive layer 1, as shown in FIG. 6.

In addition, it should be noted that when the first substrate layers 2 and the conductive layer 1 are connected together by hot pressing, a hot pressing temperature is relatively high, usually about 110° C. At this time, the first substrate layers 2 can form a viscous flow state based on the thermoplastic elastomer TPE, which has strong adhesion and can be firmly connected with the conductive layer 1. When the conductive trace 15 is etched on the conductive layer 1, the conductive layer 1 and the first substrate layers 2 need to be rolled. The rolling process is usually carried out at room temperature. At room temperature, the thermoplastic elastomer TPE has no adhesion, so that impurities such as dust and the like will not be adhered to the first substrate layers 2, thereby avoiding the influence on the subsequent molding process. However, in the prior art, the adhesive used in the diaphragm of the sound producing apparatus still has a certain adhesive force at room temperature, so that the rolling step after the etching of the conductive layer cannot be carried out, and the adhesive cannot be used to form the conductive film of the present disclosure.

In the present disclosure, thicknesses of the first substrate layers 2 and the conductive layer 1 can be flexibly adjusted by those skilled in the art as required.

In an example of the present disclosure, the thickness of the first substrate layers 2 can be controlled in the range of 3 to 50 μm, and the thickness of the conductive layer 1 can be controlled in the range of 12 to 36 μm. In this embodiment, the formed conductive film can be made to have good conductivity, and the first substrate layers 2 can play a good protective role on the conductive layer 1 in the middle. By reasonably adjusting the thickness of the first substrate layers 2 and the conductive layer 1, the whole conductive film can be ensured to have proper rigidity and flexibility, and the conductive film can be more stable when vibrating.

Figure 2:
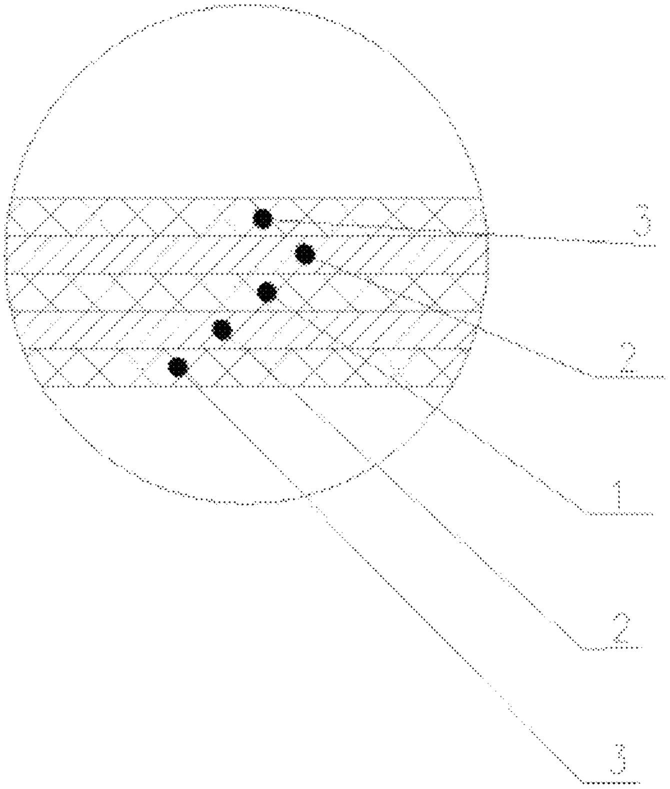
FIG. 2 is a partial schematic view of the conductive film provided by another embodiment of the present disclosure.

As shown in FIG. 2, the substrate layers of the present disclosure may further include second substrate layers 3. The second substrate layers 3 are bonded to the surfaces of the first substrate layers 2 away from the conductive layer 1.

The first substrate layers 2 are connected with the second substrate layers 3 before being connected with the conductive layer 1. However, the present disclosure is not limited to the above forming steps. It can also be the second substrate layers 3, the first substrate layers 2 and the conductive layer 1 are connected together through a hot pressing step. After the conductive layer 1 is etched into a conductive trace, the first substrate layers 2 and the second substrate layers 3 are sequentially placed above the conductive layer 1 to subject to the hot pressing step again to form the conductive film.

The second substrate layers 3 is combined with the first substrate layers 2, while the second substrate layers 3 is not directly combined with the conductive layer 1. The second substrate layers 3 can provide good protection for both the first substrate layers 2 and the conductive layer 1 inside.

In one example of the present disclosure, the second substrate layers 3 and the first substrate layers 2 are pressed together by means of hot pressing. As the first substrate layers 2 adopt the thermoplastic elastomer TPE that has good adhesion at high temperature, so that the first substrate layers 2 can be firmly combined with the surface of the second substrate layers 3 without using additional special adhesive, and the combination mode is relatively simple and the combination fastness is relatively good.

It should be noted that, as a specific embodiment, when the conductive film of the present disclosure includes the second substrate layers 3, the second substrate layers 3 and the first substrate layers 2 need to be combined together by means of hot pressing, that is, the second substrate layers 3 is bonded to the first substrate layers 2 first. Then, one surface of the first substrate layers 2 which is not bonded to the surfaces of the second substrate layers 3 is connected to one surface of the conductive layer 1 by means of hot pressing. After the conductive circuit is formed on the conductive layer 1 by etching, the other surface of the first substrate layers 2 which is not bonded to the surfaces of the second substrate layers 3 is connected to the other surface of the conductive layer 1 by means of hot pressing. The conductive layer 1 can be refrained from repeated hot pressing processes since the conductive layer 1 of the present disclosure is a copper foil and is very thin, thereby avoiding damage or destruction to the conductive layer 1 to a considerable degree and prolonging the service life thereof.

In addition, when the second substrate layers 3 are bonded to the first substrate layers 2, the second substrate layers 3 can be bonded to each of the first substrate layers 2, and the second substrate layers 3 can also be bonded to one of the first substrate layers 2, which can be flexibly selected by those skilled in the art according to the actual needs without limitation.

The second substrate layer 3 is made of a polymer material, specifically plastic, thermoplastic elastomer or rubber. In an example of the present disclosure, the second substrate layer 3 is made of any one of PEEK, PAR, PEI, PI, PPS, PEN, PET, TPEE and TPU. The second substrate layer 3 can further protect the internal conductive layer 1, so that the diaphragm can be used more safely and reliably.

The conductive film provided by the embodiment of the present disclosure includes an inner part located on an inner side, a deformation part disposed around an outer side of the inner part, and an outer part disposed outside the deformation part.

When the conductive film of the present disclosure is applied to a sound producing apparatus such as a loudspeaker, those skilled in the art can connect the outer part of the conductive film to the housing of the sound producing apparatus for fixing the conductive film.

As shown in FIG. 3, the conductive layer 1 includes a plurality of parts, respectively: a first conductive layer 101 distributed on the inner part, a second conductive layer 102 distributed on the outer part, and third conductive layers 103 distributed on the deformation part. The third conductive layers 103 connect the first conductive layer 101 and the second conductive layer 102. The first conductive layer 101, the second conductive layer 102, and the third conductive layers 103 are connected to form at least one conductive trace.

The first conductive layer 101 includes two parts independent of each other. Similarly, the second conductive layer 102 also includes two parts independent of each other. The two parts of the first conductive layer 101, the two parts of the two second conductive layer 102, and the third conductive layers 103 form two independent conductive traces. The first conductive layer 101 is provided with an inner pad 4 electrically connected with the first conductive layer 101, and the second conductive layer 102 is provided with an outer pad 5 electrically connected with the second conductive layer 102.

The inner pad 4 on the conductive film is electrically connected to a voice coil, and the outer pad 5 on the conductive film is electrically connected to an external circuit. The outer pad 5 can be electrically connected with the external circuit directly or through an elastic sheet disposed on the housing 6 of the sound producing apparatus. Those skilled in the art may adjust it flexibly according to actual needs and it is not limited thereto.

The conductive film provided by the embodiments of the present disclosure is a multilayer composite structure including a conductive layer 1, and the conductive layer 1 is provided with the inner pad 4 and the outer pad 5. The inner pad 4 can be used for electrically connecting with the voice coil, and the outer pad 5 can be used for electrically connecting with the external circuit, that is, this structure can directly connect with the internal and external signals of the terminal product through the corresponding pads. The present disclosure can realize the electrical connection between the voice coil and the conductive film without drawing the lead of the voice coil out too long, can effectively avoid the phenomenon that the lead of the voice coil breaks in the work, and improve the stability of the product. When the conductive film provided by the embodiment of the present disclosure is applied to the sound producing apparatus, the structural design of the sound producing apparatus can be simplified, the space utilization rate inside the sound producing apparatus can be improved, and the frequency response and reliability of the sound producing apparatus can be improved.

Figure 7:
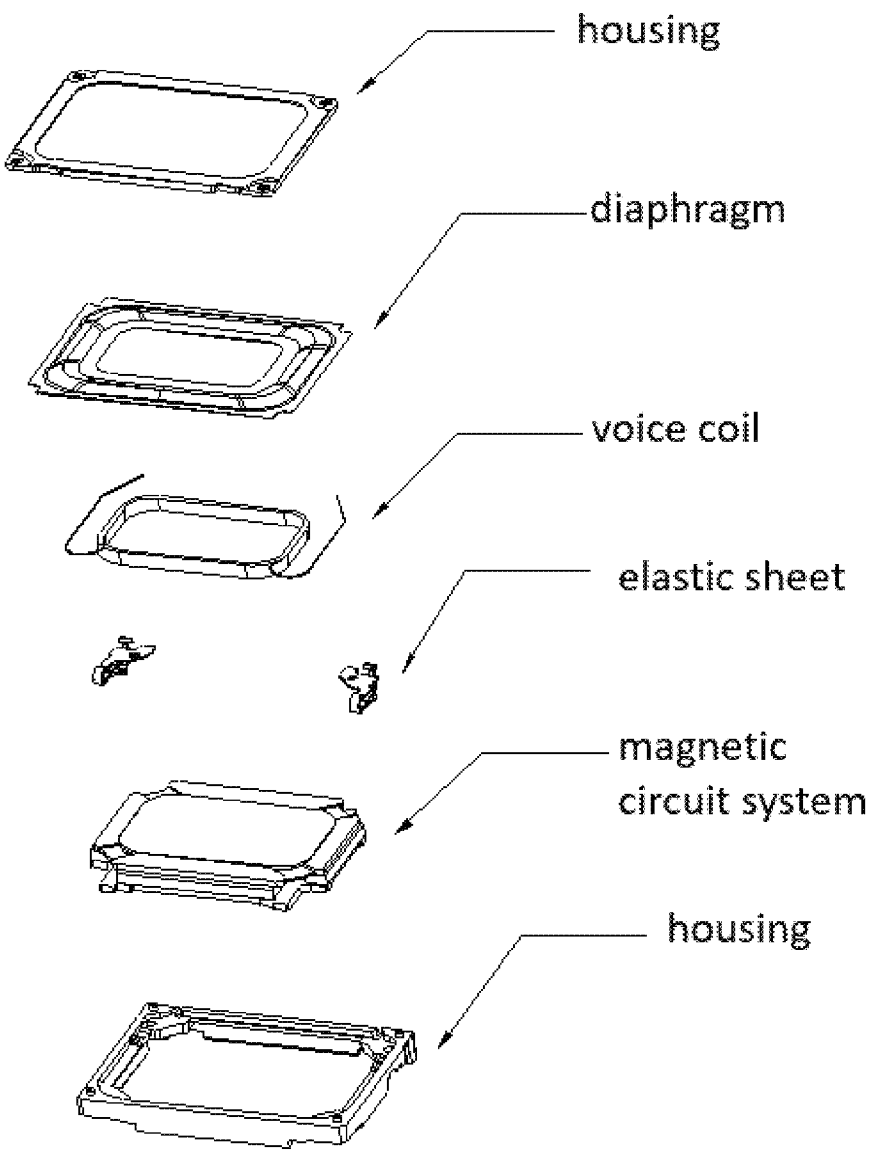
FIG. 7 is a structural schematic diagram of a sound producing apparatus provided by one embodiment of the present disclosure.

The embodiment of the present disclosure provides a sound producing apparatus. The sound producing apparatus includes a vibration system and a magnetic circuit system cooperating with the vibration system, as shown in FIG. 7. The sound producing apparatus also includes a housing with a receiving cavity, in which both the vibration system and the magnetic circuit system are received. The vibration system includes a sound producing diaphragm and a voice coil combined to one side of the sound producing diaphragm. The sound producing diaphragm adopts the conductive film above. In the working process of the sound producing apparatus, the voice coil with electrical signals interacts with the magnetic circuit system to generate up-and-down vibration, thereby driving the sound producing diaphragm to generate sound.

As shown in FIG. 3, when the conductive film of the present disclosure is used as a sound producing diaphragm, the first conductive layer 101 is of a loop structure (for example, the conductive film is rectangular as a whole, and the first conductive layer 101 has a rectangular loop structure at this time). The first conductive layer 101 is located at a position near the deformation part on an edge of the inner part of the conductive film, and the first conductive layer 101 can be used to form an electrical connection with the voice coil. Specifically, the voice coil typically has two voice coil leads for the first conductive layer 101 to form two independent conductive traces electrically connected to the two leads of the voice coil. In this embodiment, first partitions 11 are designed to be disposed on two opposite short axes of the rectangular loop first conductive layer 101, and no conductive layer is disposed at the positions where the first partitions 11 are located so that the first conductive layer 101 is divided into two independent parts. The inner pad 4 electrically connected to the first conductive layer 101 is provided inside the first conductive layer 101. The number of the inner pads 4 is at least two, which can be used for electrically connecting with the two leads of the voice coil.

Each conductive trace is provided with the inner pad 4, and the lead of the voice coil can be electrically connected with any one of the two inner pads 4 corresponding to the conductive trace. Certainly, there may also be provided with more of the inner pads 4, for example, four, six, etc., which can be flexibly adjusted by those skilled in the art according to actual needs without limitation.

In addition, an avoidance hole for avoiding is provided on the first substrate layer 2 near the voice coil side corresponding to the inner pad 4. The avoidance hole is used for facilitating a conductive combination of the lead of the voice coil and the inner pad 4 by electric welding.

As shown in FIG. 3, when the conductive film of the present disclosure is used as a sound producing diaphragm, the second conductive layer 102 is of a loop structure (for example, when the conductive film is rectangular as a whole, the second conductive layer 102 also has a rectangular loop structure).

The second conductive layer 102 is located at an edge of the conductive film, i.e., at an edge of the outer part, for connection with the external circuit. Similarly, in order to form two independent conductive traces, in this embodiment, second partitions 12 are designed to be disposed on two opposite short axes of the rectangular loop second conductive layer 102, and no conductive layer is disposed at the positions where the second partitions 12 are located so that the second conductive layer 102 can be composed of two independent parts.

At least two corners of the second conductive layer 102 are provided with outer pads 5. The outer pad 5 is used for electrically connecting with the electrical connector on the housing of the sound producing apparatus by electric welding or the like. The first substrate layers 2 corresponding to the upper part and the lower part of the outer pad 5 are provided with avoidance areas for avoiding the outer pads 5, so that the outer pads 5 can be properly exposed from the substrate layers 2 to facilitate electrical connection with the external circuit. For a terminal product such as a sound producing apparatus, an electrical signal inside the terminal product can be controlled by electrically connecting the outer pad 5.

In addition, a metal protective layer may be provided on the surfaces of the inner pad 4 and the outer pad 5. The metal protective layer may, for example, be formed by electroplating, or, of course, a metal protective layer may be bonded to the outer and inner pads, and there is no restriction on this.

As shown in FIG. 3 when the conductive film of the present disclosure is used as a sound producing diaphragm, the third conductive layers 103 have a strip-shaped structure. The third conductive layers 103 connect the first conductive layer 101 and the second conductive layer 102 (for example, the conductive film is rectangular as a whole, and both the first conductive layer 101 and the second conductive layer 102 have a rectangular loop structure). In this embodiment, the third conductive layers 103 are respectively provided on two opposite long axis sides of the rectangular conductive films. The structure and position of the third conductive layers 103 can increase the strength of the rectangular conductive films in the long axis direction which helps to improve the acoustic performance of the conductive film. The third conductive layers 103 may include at least three strip-like structures disposed in parallel which can enhance the stability of the electrical connection.

In addition, when the conductive film of the present disclosure is used as a sound producing diaphragm, it may also include a rigid reinforcing part, and the reinforcing part is combined inside the conductive film. When the rigid reinforcing part is provided on the conductive film of the present disclosure, the reinforcing part and the conductive film can be combined together in a manner well known to those skilled in the art (e.g., adhesion). The high frequency characteristics of the conductive film can be effectively improved by adding the rigid reinforcing part on the conductive film. However, it should be noted that for the conductive film of the present disclosure, those skilled in the art can choose whether to arrange the reinforcement part on the conductive film or not according to the actual needs, and there is no restriction on this.

When a rigid reinforcing part is disposed in the inner part of the conductive film, the reinforcing part can play a good supporting role in the electric welding process, so as to prevent the whole conductive film from collapsing and other undesirable phenomena in the electric welding process. Therefore, the reinforcing part can be covered at the position where the inner pad 4 is located. The reinforcing part is, for example, any one selected from epoxy resin, PET, PEN, metal sheet, PEI, PAR, PPS, PES and other materials.

Figure 8:
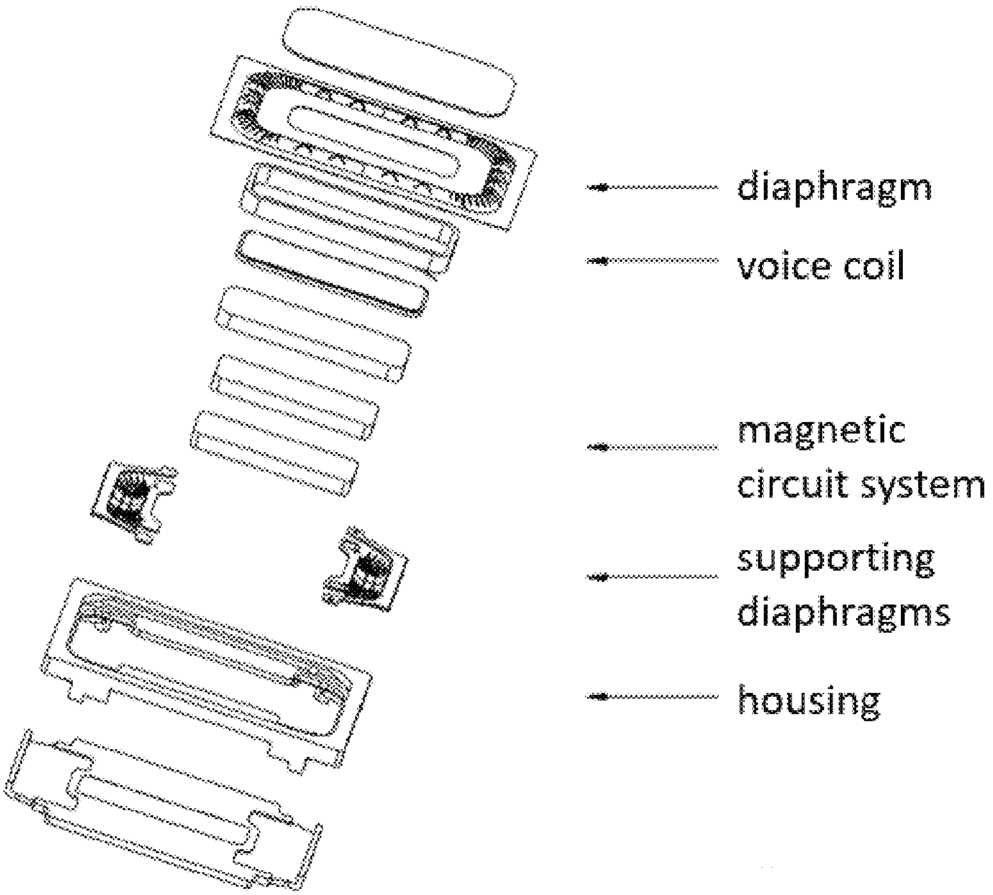
FIG. 8 is a structural schematic diagram of a sound producing apparatus provided by another embodiment of the present disclosure.

The conductive film of the present disclosure can be used not only as a sound producing diaphragm, but also as a supporting diaphragm. The embodiment of the present disclosure also provides a sound producing apparatus, which includes a vibration system and a magnetic circuit system cooperating with the vibration system. The vibration system includes a sound producing diaphragm, a voice coil combined to one side of the sound producing diaphragm, and a supporting diaphragm for elastically supporting the voice coil, as shown in FIG. 8. The supporting diaphragm adopts the conductive film of the present disclosure. Typically, the voice coil includes two oppositely disposed long sides and two oppositely disposed short sides, and the supporting diaphragm is provided on each short side of the voice coil. For example, at least one of the supporting diaphragms is a conductive film of the present disclosure. When the conductive film is used as a supporting diaphragm, the conductive film has the advantage of stable vibration, can be used to prevent the internal vibration system from being polarized, can improve the loudness of the sound producing apparatus, and can reduce nonlinear distortion.

Figure 4:
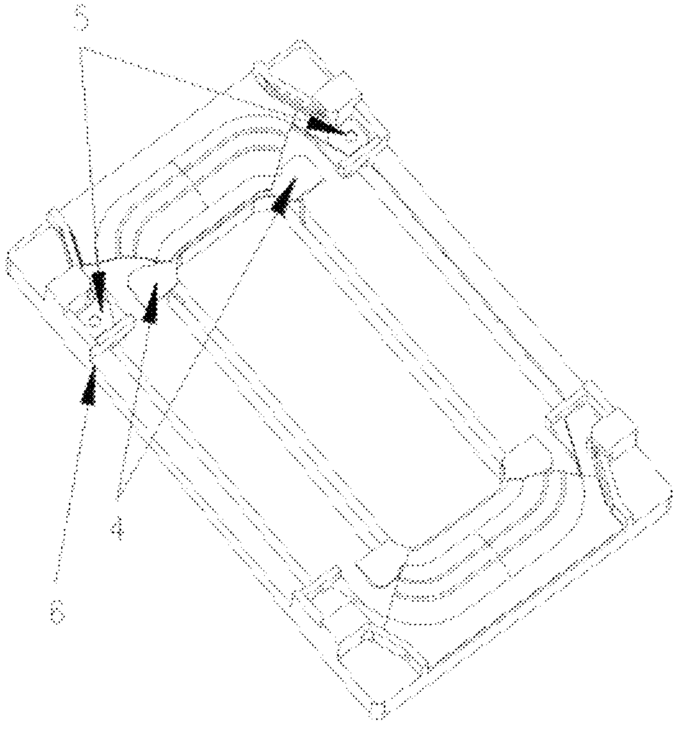
FIG. 4 is a partial schematic view of a sound producing apparatus provided by the embodiments of the present disclosure.
Figure 5:
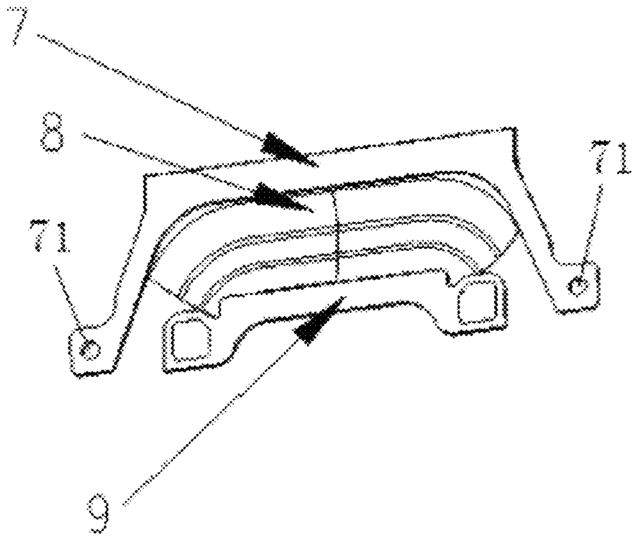
FIG. 5 is a structural schematic diagram of a supporting diaphragm provided by the embodiments of the present disclosure.

As shown in FIGS. 4 and 5, when the conductive film of the present disclosure is used as a supporting diaphragm, it is provided at each short side of the voice coil and may be sector-shaped. At this time, the supporting diaphragm can cover the whole short side of the voice coil, which makes the supporting force more balanced and the elastic restoring force better.

Certainly, when the conductive film is used as the supporting diaphragm, it is not limited to the aforementioned sector shape, but may be an arc shape or another shape, and there is no limitation on this.

As shown in FIG. 5, an outer part 7, an inner part 9, and a deformation part 8 are distributed on one of the supporting diaphragms of the present disclosure. The outer part 7 is configured to be connected with the housing 6 and the inner part 9 is configured to be connected with the voice coil. The conductive layer includes a first conductive layer distributed on the inner part 9, a second conductive layer distributed on the outer part 7, and third conductive layers distributed on the deformation part 8. And the third conductive layers connect the first conductive layer and the second conductive layer, the first conductive layer, the second conductive layer, and the third conductive layers are connected to form two independent conductive traces (not shown), and the first conductive layer is provided with two inner pads 4 electrically connected to the two conductive traces, and the second conductive layer is provided with two outer pads 5 electrically connected to the two conductive traces. The inner pad 4 can be used for electrically connecting with the voice coil, and the outer pad 5 can be used for electrically connecting with the external circuit, so that the electrical connection between the voice coil and the conductive film can be realized without drawing the lead of the voice coil out too long, the phenomenon that the lead of the voice coil breaks in the work can be effectively avoided, and the stability of the product can be improved.

The thickness of the substrate layers corresponding to the outer part 7 and the inner part 9 is relatively thick, so that the substrate layers can play a role of structural support. The deformation part 8 is used to form a corrugated rim structure and provide an elastic supporting force, and the thickness of the corresponding substrate layers is relatively thin and the sensitivity is relatively high.

In addition, the outer pad 5 is provided with a through hole 71 for welding. When soldering is performed, solder paste located on a lower surface of the outer pad 5 passes through the through hole 71 to an upper surface of the outer pad 5. The through hole 71 increases a contact area between the solder paste and the outer pad 5. After solidification of the solder paste, the outer pad 5 is connected with the conductive terminals on the housing.

On the other hand, the embodiment of the present disclosure also provides an electronic device including the above sound producing apparatus.

The electronic device can be mobile phones, tablet computers, smart wearable devices, smart watches, walkie-talkies, televisions, smart speakers and the like, but not limited thereto. The electronic device may include a housing and the sound producing apparatus of the embodiment of the present disclosure, and the sound producing apparatus is received and fixed in the housing.

While some specific embodiments of the present disclosure have been described in detail by way of examples, it should be understood by those skilled in the art that the above examples are for illustration only and are not intended to limit the scope of the present disclosure. It will be apparent to those skilled in the art that modifications to the above embodiment can be made without departing from the scope or spirit of the present disclosure. The scope of the present disclosure is limited by the appended claims.

The invention claimed is:

1. A conductive film for a sound producing apparatus, comprising:

a conductive layer having first and second surfaces, and two or more substrate layers, wherein:

the two or more substrate layers comprise two first substrate layers directly bonded to the conductive layer, the two first substrate layers comprising a thermoplastic elastomer, the two first substrate layers are hot pressed connected with the conductive layer, the thermoplastic elastomer is hot pressed to form a viscous flow state, such that the two first substrate layers and the conductive layer are combined together without an adhesive, and the thermoplastic elastomer is non-conductive; and a conductive circuit etched on the second surface of the conductive layer, wherein:

a first one of the two first substrate layers is hot pressed connected with the first surface of the conductive layer, one of the two first substrate layers and the conductive layer are rolled, and a second one of the two first substrate layers is hot pressed connected with the second surface of the conductive layer and the first one of the two first substrate layers.

2. The conductive film for the sound producing apparatus of claim 1, wherein:

the conductive layer is a metal foil.

3. The conductive film for the sound producing apparatus of claim 1, wherein:

the conductive layer is a copper foil, the copper foil is a rolled copper foil.

4. The conductive film for the sound producing apparatus of claim 1, wherein:

the two first substrate layers are made of thermoplastic polyurethane elastomer (TPU) or thermoplastic polyester elastomer (TPEE).

5. The conductive film for the sound producing apparatus of claim 1, wherein:

the conductive layer has a thickness of 12 to 36 μm, and the two first substrate layers have a thickness of 3 to 50 μm.

6. The conductive film for the sound producing apparatus of claim 1, wherein:

the two or more substrate layers further comprise two second substrate layers bonded to the two first substrate layers away from the conductive layer.

7. The conductive film for the sound producing apparatus of claim 6, wherein:

the two second substrate layers are made of plastic, thermoplastic elastomer or rubber.

8. The conductive film for the sound producing apparatus of claim 7, wherein:

the two second substrate layers are made of any one of polyether ether ketone (PEEK), polyarylate (PAR), polyester elastomer (PEI), polyimide (PI), polyphenylene sulfide (PPS), polyethylene naphthalate (PEN), polyethylene terephthalatee (PET), TPEE and TPU.

9. The conductive film for the sound producing apparatus of claim 1, wherein:

the conductive layer is provided with an inner pad configured to be connected with a voice coil and an outer pad configured to be connected with an external circuit; and both the inner pad and the outer pad are exposed from the two or more substrate layers.

10. The conductive film for the sound producing apparatus of claim 1 further comprising:

an inner part located on an inner side, a deformation part disposed outside the inner past, and an outer part disposed outside the deformation part; and the conductive layer includes a first conductive layer distributed on the inner part, a second conductive layer distributed on the outer part and third conductive layers distributed on the deformation part, the third conductive layers connecting the first conductive layer and the second conductive layer, and the first conductive layer, the second conductive layer and the third conductive layers are connected to form at least one conductive trace.

11. The conductive film for the sound producing apparatus of claim 10, wherein:

the first conductive layer and the second conductive layer each comprises two parts independent of each other, and the two parts of the first conductive layer, the two parts of the second conductive layer and the third conductive layers form two independent conductive traces.

12. The sound producing apparatus comprising:

a vibration system and a magnetic circuit system cooperating with the vibration system;

wherein the vibration system comprises a sound producing diaphragm and a voice coil, combined to one side of the sound producing diaphragm, the sound producing diaphragm adopting the conductive film of claim 1.

13. The sound producing apparatus comprising:

a vibration system and a magnetic circuit system, cooperating with the vibration, system;

wherein the vibration system comprises a sound producing diaphragm, a voice coil combined to one side of the sound producing diaphragm, and a supporting diaphragm for elastically supporting the voice coil, the supporting diaphragm adopting the conductive film of claim 1.

14. The sound producing apparatus of claim 13, wherein:

the voice coil comprises two long sides and two short sides, and the supporting diaphragm comprising two first supporting diaphragms are disposed on the two short sides of the voice coil; and at least one of the two first supporting diaphragms adopts the conductive film.

* * * * *